United States Patent
Brunetti et al.

(10) Patent No.: US 6,507,278 B1
(45) Date of Patent: Jan. 14, 2003

(54) INGRESS/EGRESS CONTROL SYSTEM FOR AIRPORT CONCOURSES AND OTHER ACCESS CONTROLLED AREAS

(75) Inventors: Sam Brunetti, Catharpin, VA (US); Scott Firesheets, Alexandria, VA (US); Lee Thew, Jefferson, MD (US); Don Woody, Sunderland, MD (US)

(73) Assignee: ADT Security Services, Inc., Boca Raton, FL (US)

( * ) Notice: Subject to any disclaimer, the term of this patent is extended or adjusted under 35 U.S.C. 154(b) by 0 days.

(21) Appl. No.: 09/678,776

(22) Filed: Oct. 4, 2000

Related U.S. Application Data

(60) Provisional application No. 60/214,378, filed on Jun. 28, 2000.

(51) Int. Cl.[7] .............................................. G08B 13/00
(52) U.S. Cl. ...................... 340/541; 340/5.12; 340/5.3; 340/5.32; 340/5.7
(58) Field of Search ............................... 49/49, 68, 93, 49/95, 104, 109, 113, 116, 117, 118; 160/113, 114, 116, 199, 206, 180, 118–187; 340/541

(56) References Cited

U.S. PATENT DOCUMENTS

| | | | | |
|---|---|---|---|---|
| 3,967,411 A | * | 7/1976 | Ulmann | 49/68 |
| 4,136,641 A | * | 1/1979 | Hoffmann | 119/155 |
| 4,261,297 A | * | 4/1981 | Van Maarion et al. | 119/155 |
| 4,534,395 A | * | 8/1985 | Carroll | 160/199 |
| 4,718,205 A | * | 1/1988 | Taylor | 52/79.8 |
| 5,183,008 A | * | 2/1993 | Carrano | 119/155 |
| 5,212,909 A | * | 5/1993 | Morin | 49/49 |
| 5,335,710 A | * | 8/1994 | Belanger | 160/199 X |
| 5,845,692 A | * | 12/1998 | Kellem et al. | 160/118 |

\* cited by examiner

*Primary Examiner*—Daryl Pope
(74) *Attorney, Agent, or Firm*—Polster, Lieder, Woodruff & Lucchesi, L.C.

(57) ABSTRACT

An ingress/egress control system (10) controls passenger (P) flow into and out of an airport concourse. Enplaning passengers pass through an entrance portal (18) on their way to an airplane gate. A security screen (22) screens each person passing through the portal for the presence of prohibited items and identifies any person suspected of carrying such an item. A secondary portal (50) is located downstream of the first portal. A visual display system (52) responds to an indication from the security screening to route a suspected person from the first portal to the secondary portal, for further screening to determine if the person is carrying a prohibited item, while providing a different display to passengers passing the security screen so they can enter the concourse.

A separate, exit portal (64) is provided for deplaning passengers exiting the concourse. Multiple detectors (42*a*′–42*b*′, 82, 88) continuously monitor this portal so people cannot inadvertently or intentionally intrude into the exit path. Audio and visual alarms (79, 92) are activated when someone attempts to enter the concourse through the exit portal to both warn the person away and to alert security personnel of a possible intruder. An imaging system (VM) is used to obtain and store a video of image of the intruder.

62 Claims, 11 Drawing Sheets

INGRESS/EGRESS CONTROL SYSTEM FOR AIRPORT CONCOURSES AND OTHER ACCESS CONTROLLED AREAS

CROSS-REFERENCE TO RELATED APPLICATIONS

U.S. provisional patent application No. 60/214,378 filed Jun. 28, 2000.

STATEMENT REGARDING FEDERALLY SPONSORED RESEARCH OR DEVELOPMENT

Not applicable.

BACKGROUND OF THE INVENTION

This invention relates to the control of movement into and out of secured or access-controlled areas, and more particularly, to a control system to effect movement of airline passengers from a public area of an airport terminal into a secure, controlled area such as a concourse leading to gates by which passengers embark onto an airplane and from which disembarking passengers exit the concourse into the public area.

With the threat of airline hijackings which began in the 1960's and 70's, and the more recent terrorist threats of placing bombs on airplanes to blow them up during flight, airports have been more and more involved with passenger safety and airplane security. To this end, airports in the United States have established control points within their terminals. Typically, these control points are set-up at those areas leading from the public areas of the terminal (where ticket counters, ground transportation centers, restaurants and gift shops are located) into the aisles (concourses) where the airplane gates are located. A control point functions to a) screen people entering the concourse from an entry (or Q side) and b) insure that no one circumvents the control point by trying to enter the concourse through its exit (or X side).

At present, a control point typically includes one or more conveyors onto which passengers are required to place any luggage, handbags, or other articles. These items are then conveyed past an X-ray machine (or other screening device) by which the contents of the items can be viewed by security personnel. If a suspicious item is spotted, the item is removed from the conveyor and required to be opened by the person carrying it so a close visual inspection can be made.

Each person is also examined. This is done by having the person pass through an archway or portal which includes a magnetometer, for example, that provides a primary level of screening. If the magnetometer detects an object which is suspect, an alarm is sounded and the person is stopped by security personnel. The person is usually requested to empty his or her pockets, step back through the archway and reenter it again. If the second passage does not cause an alarm, the items the person removed are returned to them and they are allowed to continue. If an alarm again sounds, the person may be requested to cycle back through the arch yet a third time, or security personnel will use a magnetometer wand (a second level of screening) to go over the person's body to locate whatever is causing the alarm. It will be appreciated that having people recycle through the primary screening point clogs the lane leading to the checkpoint, and creates a bottleneck for others needing to get to their gates.

Heretofore, the exit (X Arch) side of the control point has usually been open; that is, there are no restrictions such as at the entry (Q Arch) side. One reason for this, of course, is to not impede deplaning passengers from leaving the concourse area. However, a major drawback to this arrangement is that an open space is provided for someone wanting to circumvent the security checkpoint or who inadvertently wanders into the exit passage. While exit lanes are usually clearly marked, the warning is a visual warning only and may be missed by someone not paying attention because they are otherwise engaged in looking for deplaning family or friends. Usually this X side of the security point is manned by security personnel whose function is to stop people from entering the concourse this way. If, however, someone enters a concourse through this exit route and eludes the security personnel stationed there, the effect is the concourse must be shut down until the person is located. This includes prohibiting planes located at gates along the concourse from leaving until the intruder is found or determined to no longer be in the area. This causes substantial delays, passenger inconvenience, and missed connections. A number of these incidents have recently occurred at major airports with the resultant cost running into millions of dollars in each instance.

Other problems attendant with current security checkpoints include incorrect information as to the number of passengers entering a particular concourse. Airlines, in effect, rent gates from an airport. One measure of the rental charged by the airport is the number of people using a concourse to embark on planes flown by a particular airline. As people pass through the checkpoint, they are automatically counted and a report including this count is periodically created. Airlines are then assessed based upon the count. The difficulty with this procedure in current installations is as follows:

As noted above, if a passenger passing through the checkpoint triggers an alarm, that person is asked to go back through the portal, empty his or her pockets, and pass back through. In doing so, that person is counted three times. Once when they first enter, a second time when they have to go back through, and a third time when they re-enter. Most people successfully pass through the checkpoint the first time, but some do not. The resultant multiple counting of people sufficiently distorts the reported volume as to have a significant economic impact.

Another problem which occurs is theft and fraud. With conventional installations, a person approaching the entrance places their luggage, briefcase, purse, laptop computer, camera, etc. on a conveyor which conveys these articles past an X-ray unit as previously mentioned. The person then retrieves their articles from the other end of the conveyor and proceeds to their gate. While the articles are examined, and the persons passing through a portal are being screened, as a rule, no one checks to see that the correct person is retrieving the articles. One reason for this is the limited number of security people assigned to the checkpoint and the multiple duties they are required to perform. As a result, if there is a long line of people waiting to pass through the portal, items may reach the other end of the conveyor well before their owner. If someone picks up someone else's camera, for example, no one will likely notice. On the other hand, if someone passing through the entrance claims that an article has been stolen, there is no way to know if the person is telling the truth or not. As a rule, the airport/airline/security agency/insurance company pays off on a claim that can be in the range of hundreds or thousands of dollars.

BRIEF SUMMARY OF THE INVENTION

Among the several objects of the present invention may be noted the provision of a passenger security system for use in airports and other facilities in which both ingress into a controlled part of a facility and egress therefrom must be strictly controlled and monitored. The ingress and egress portions of the security system can be implemented together, or separately.

It is further an object of the invention to not only control ingress into a secured area, but to also increase the pass-through rate of people into the controlled area. To this end, visual cues are provided by which approaching persons can readily tell which lanes through the checkpoint are open and which are not, how they are to proceed through the checkpoint, and what items are prohibited. The system operates to not unduly delay passengers heading for gates and increases the number of people (throughput) who can pass through a screening point over a given period of time; all of this without comprising security. Provisions are also made for the efficient screening of handicapped individuals. Further, the system provides an accurate count of all persons passing through the control point to facilitate auditing by an airport, for example, of those people using a concourse. In a multi-lane facility, individual lane counts are also made.

Another object of invention is a multi-stage screening of passengers entering the checkpoint. The multi-stage approach allows passengers who pass a primary security screen upon entering the checkpoint to immediately continue down a concourse. Those passengers who fail the primary screen are not directed to go back through and re-enter the checkpoint, which can clog the checkpoint and cause delays. Rather, these passengers are directed away from the main passenger flow to a secondary screening point where they are subjected to a second and more rigorous check. Those passengers who pass this check re-enter the normal passenger flow downstream from the checkpoint. Those who fail this second screening are subjected to a personal search by security personnel. The security screening implemented by the system, besides improving flow through the checkpoint, requires a minimal amount of space (so more lanes can be provided, if desired), as well as fewer security personnel.

Yet another object of the invention is an audio/visual system for efficiently moving people through the checkpoint. Light bars installed adjacent each lane are color controlled to indicate which lane is open and which is not. DVD or similar visual displays show passengers approaching a lane how to proceed through the checkpoint. Other visual displays indicate those items (explosives, firearms, etc.) which are not allowed through the checkpoint, as well as other pertinent information. The visual system also routes passengers through the various levels of screening to efficiently move people requiring further screening out of the way of passengers who can move on to their gate.

A further object of the invention is a continuous monitoring of all people approaching the checkpoint and providing a visual indication to the people that they are being watched and their actions recorded. This substantially reduces the possibility of theft since a potential thief can see his activities are being monitored. Similarly, the number of fraud claims is substantially reduced because recorded events are readily played back to see if a claim is legitimate.

Another object of the invention is an egress control by which passengers exiting a concourse can readily do so, but by which persons inadvertently or intentionally attempting to toss items (weapons, explosives, etc.) through the exit arch or circumvent the ingress checkpoint are prevented from doing so. Flow control doors extend across the portion of the concourse through which passengers exiting the concourse pass. The doors are controlled to only open outwardly and can be commanded to remain closed in the instance of a violation of the egress device. Further, motion detectors located in the exit passage detect movement of people approaching the exit. Multilingual audio and visual alarms, as well as a monitoring system, are utilized to warn people away from the exit, to alert security personnel, and to obtain a visual recording of those approaching the exit. These control and detection features further eliminate the need for security people to constantly monitor the exit.

Another object of the invention is a control unit for controlling operation of the system. The control unit allows security personnel to selectively open and close passenger flow lanes, monitor video from all the lanes, record video, and transmit video to remote sites. The control unit facilitates electronic control of passenger flow through the lanes and collection of lane information, and closed circuit television (CCTV) monitoring of incoming and outgoing luggage. The control unit provides touch screen control for all user functions, password protection, remote monitoring from a supervisory console and remote, dial-in servicing and diagnostics.

Finally, it is an object of the invention to provide a flow control system which makes more effective use of security personnel located at the checkpoint, thus reducing the overall cost of security. The system operates as unobtrusively as possible without compromising security at the checkpoint, and while improving passenger flow and substantially eliminating bottlenecks.

In accordance with the invention, generally stated, an ingress/egress or flow control system (commonly referred to as "Q control" and consisting of a Q entrance arch and an X exit arch) controls passenger flow into and out of an airport concourse, for example, or into and out of other secure areas. The system includes at least one entry (Q Arch) portal through which enplaning passengers enter into the concourse on their way to an airplane gate. A security screen located at the portal screens each passenger as they pass through the portal for the presence of items such as firearms and explosives which are prohibited. The security screen identifies any person suspected of carrying a prohibited item through the portal. A secondary portal is located downstream of the first portal. A visual display system is responsive to an indication from the security screen to route a suspected person from the first portal to the secondary portal where further screening takes place to determine if the person is indeed carrying a prohibited item. However, the visual display system provides a further display which allows all the passengers who passed the security screen to enter the concourse and proceed to their gate area.

Another, separate (X Arch) portal is provided for deplaning passengers to exit the concourse. A monitoring system continuously monitors this portal to insure that people do not inadvertently or intentionally try to bypass the entry portal or toss items through the portal. Audio and visual alarms are activated when someone attempts to enter the concourse through the exit portal to both warn the person away and to alert security personnel of a possible intruder. An imaging system is also activated to obtain a video of image of the intruder, this image being recorded to help identify the intruder if necessary. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 14:
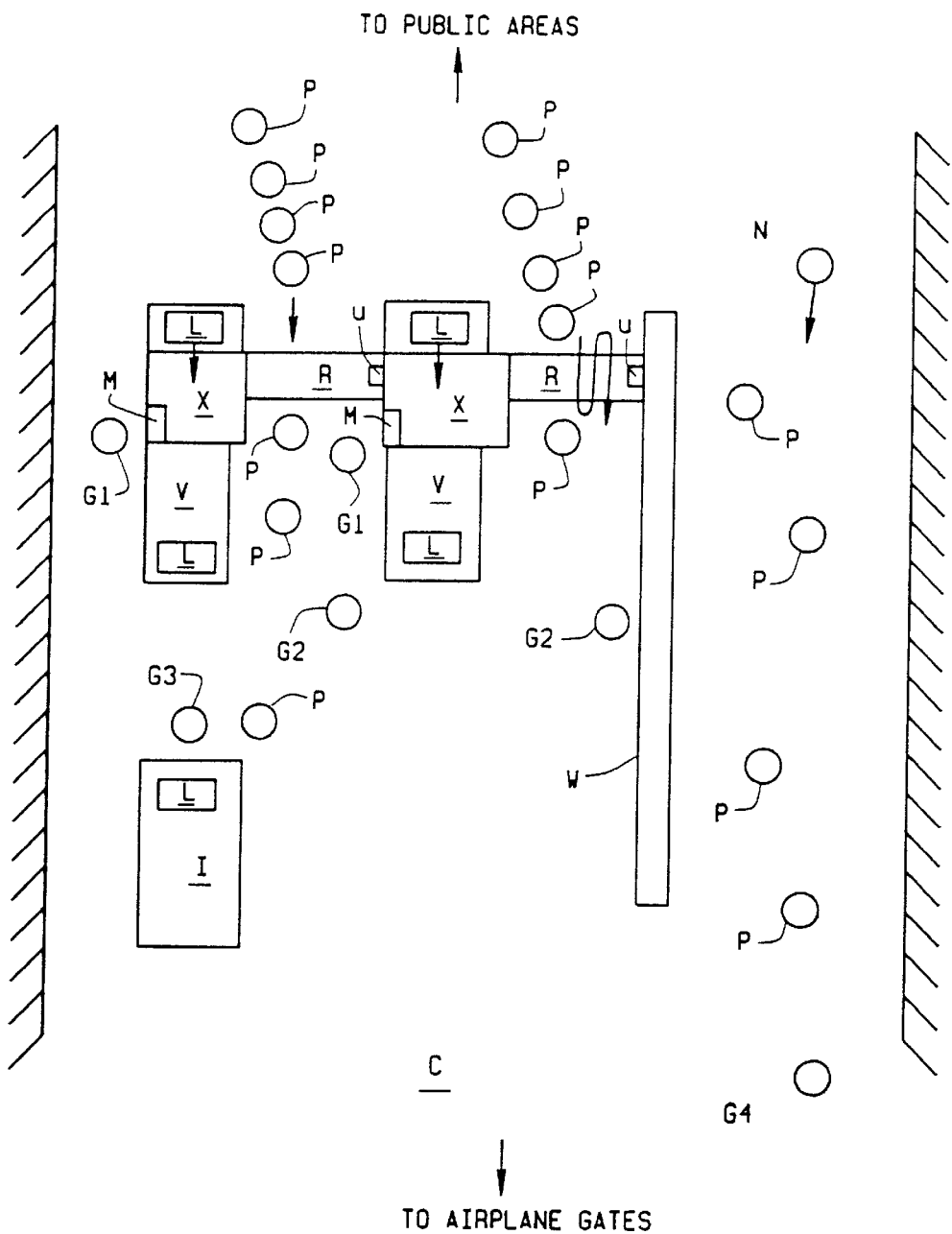
FIG. 14 is representation of a prior art system of checkpoint control.

Referring to the drawings, FIG. 14 illustrates a conventional passenger screening system such as is found in airports. Passengers P wanting to enter a concourse C approach one of a plurality of portals R through which he or she must pass. Each portal has an associated conveyor V on which a passenger places their luggage L and other articles they are carrying. The articles are conveyed through an X-ray machine X where the contents of the luggage are scanned by a guard G1 viewing a monitor M. The passenger then passes through the portal and as he or she does, they pass through a magnetometer (not shown) built into the walls of the portal. If the passenger is still carrying objects (keys, metallic jewelry) which set off the magnetometer, an alarm sounds and another guard G2 instructs the passenger to remove watches and jewelry they are wearing and whatever is in their pockets. As indicated by the sinuous line, the passenger then passes back through the portal and re-enters through it again. If a person and luggage pass the screening, the passenger retrieves the luggage from the end of the conveyor and proceeds down the concourse. If the passenger or their luggage requires additional inspection before being allowed to a pass, they are diverted to an inspection area I where the luggage is opened for visual inspection by another guard G3, or the passenger is more thoroughly searched. For purposes previously discussed, a counter located at each portal counts the number of people passing through the portal.

A wall W separates the ingress side from the egress side of the concourse. People exiting the concourse pass on the opposite side of wall W from where the inspection portals and conveyors are located. To prevent someone (an intruder N) from bypassing the ingress screening and entering the concourse the wrong way, a guard G4 is stationed on the egress side of the wall.

As discussed in the Background section of this application, there are numerous problems and drawbacks associated with the current configuration. An ingress/egress (Q/X) passenger screening system 10 of the invention, as is now described, solves these problems and overcomes these drawbacks. For purposes of the following discussion, system 10 is described as used in an airport setting. However, it will be understood, that system 10, or portions thereof can be used in any environment where access control is employed.

Figure 1:
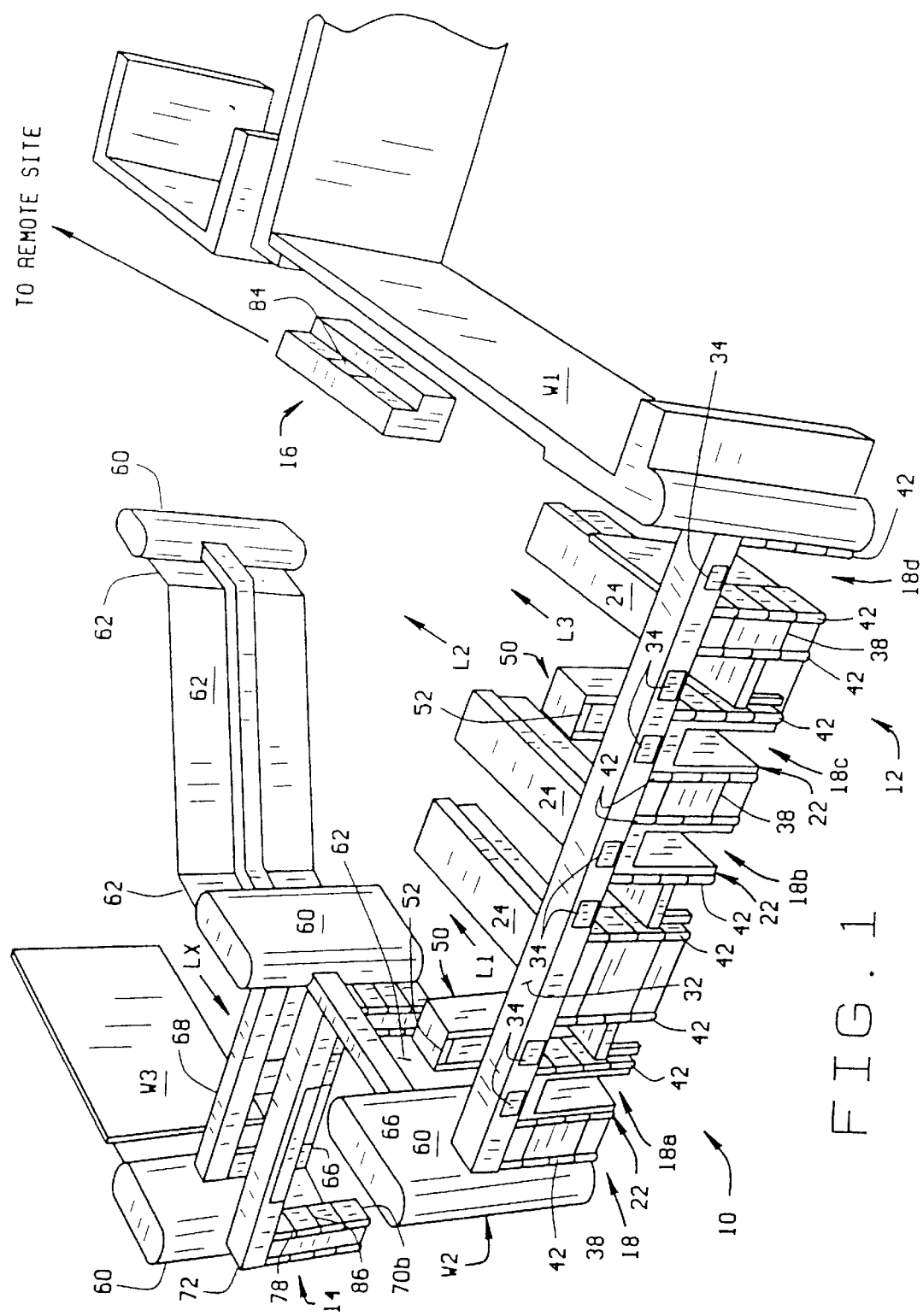
FIG. 1 is a perspective view of an ingress/egress (Q/X) system of the present invention viewed from the approach to the entry side of the checkpoint.
Figure 2:
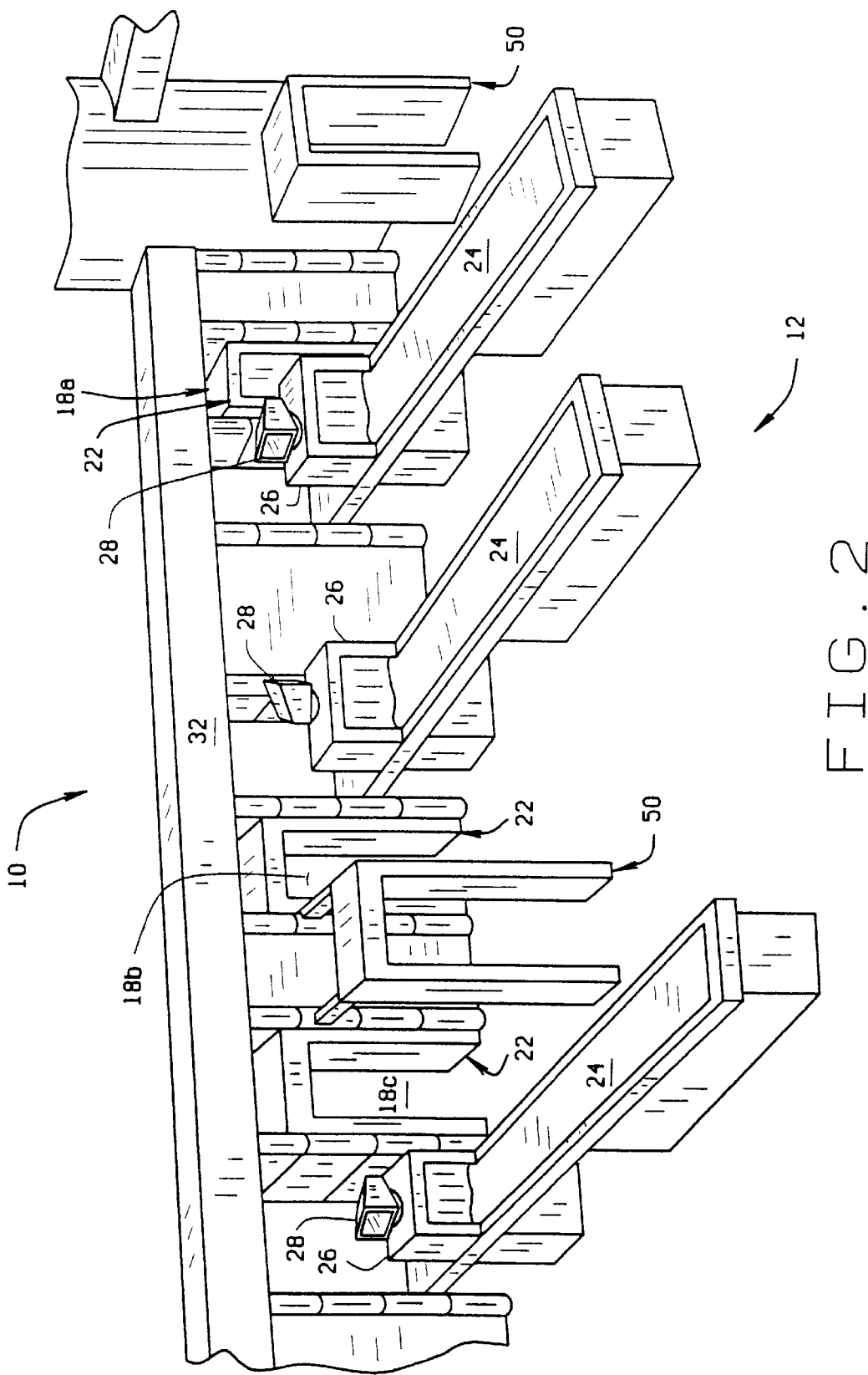
FIG. 2 is another perspective view of the system viewed from the opposite side of the checkpoint entry.

Referring to FIGS. 1 and 2, system 10 includes an ingress or Q section indicated generally 12, and an egress or X section indicated generally 14. In addition to sections 12 and 14, system 10 further includes a control console or system monitoring station 16 which is located in proximity to the other sections, or it can be remote thereto. For convenience, the control station is shown located in proximity to the other sections in FIG. 1. In general, and as described hereinafter, Q section 12 incorporates an information system and directional lighting built into a facade. The information system provides passenger pre-screening information that provides both preparatory and regulatory information to passengers as they prepare for the screening process. The lighting system incorporates fiber optic lighting for down lighting over luggage conveyors and lane open or closed indications. A closed circuit television system employs two monitors for each passenger ingress lane. One camera provides a facial view of the person placing an item on a conveyor, and another camera records the person retrieving items from the conveyor. The various systems used in the Q section employ off-the-shelf components.

In FIGS. 1 and 2, Q section 12 is shown to include a plurality of portals or archways 18 by which passengers enter an airport concourse from a public, unsecured area. Three such portals 18a–18c for use by regular passengers are shown in the drawings; although it will be understood that system 10 can accommodate more or fewer portals. Each portal 18a–18c is an open portal which is wide enough to allow only one person to pass through the portal at any one time. Each portal is defined by a pair of sidewalls 20a, 20b (see FIG. 3). The sidewalls are formed of a single panel, or they may be formed from interlocking modules which are vertically stacked. Regardless, the sidewalls are spaced far enough apart that a magnetometer unit 22 can be set in place between them. The purpose of the magnetometer unit, as previously discussed, is to monitor people passing through the portal to detect metal objects carried on their person. A third sidewall 20c (see also FIG. 3) further defines the portal. This sidewall is spaced from sidewall 20b a distance sufficient to accommodate a conveyor indicated generally 24 and upon which people entering the portal place their luggage and other articles for an X-ray inspection. The X-ray unit is built into the sides of a tunnel section 26 of the conveyor with the resulting images viewed on a monitor by a guard. The images seen on the X-ray screen can be recorded along with those of the CCTV cameras on a VCR with the use of an optional video scan converter. A camera 28 placed is directed at the end of conveyor 24 to monitor the people retrieving items from the end of the conveyor. Trays 29 (see FIG. 3) are provided adjacent the conveyor for small items such as keys and coins. The trays are dispensed via chutes adjacent each conveyor 24 and are continually supplied from the backside of the Q arch by screening personnel.

For handicapped individuals who cannot easily move through one of the portals 18a–18c, people in wheelchairs, or people who may otherwise need assistance, a portal 18d is provided. This portal is wider than the other portals and is normally closed by a door 30. When a wheelchair bound or other handicapped person approaches door 30, the door is opened by a guard to admit the person who is then personally screened by a guard. As a rule, people accompanying the handicapped person are not allowed to enter the concourse through portal 18d, but rather, they must pass through one of the other portals 18a–18c.

Figure 3:
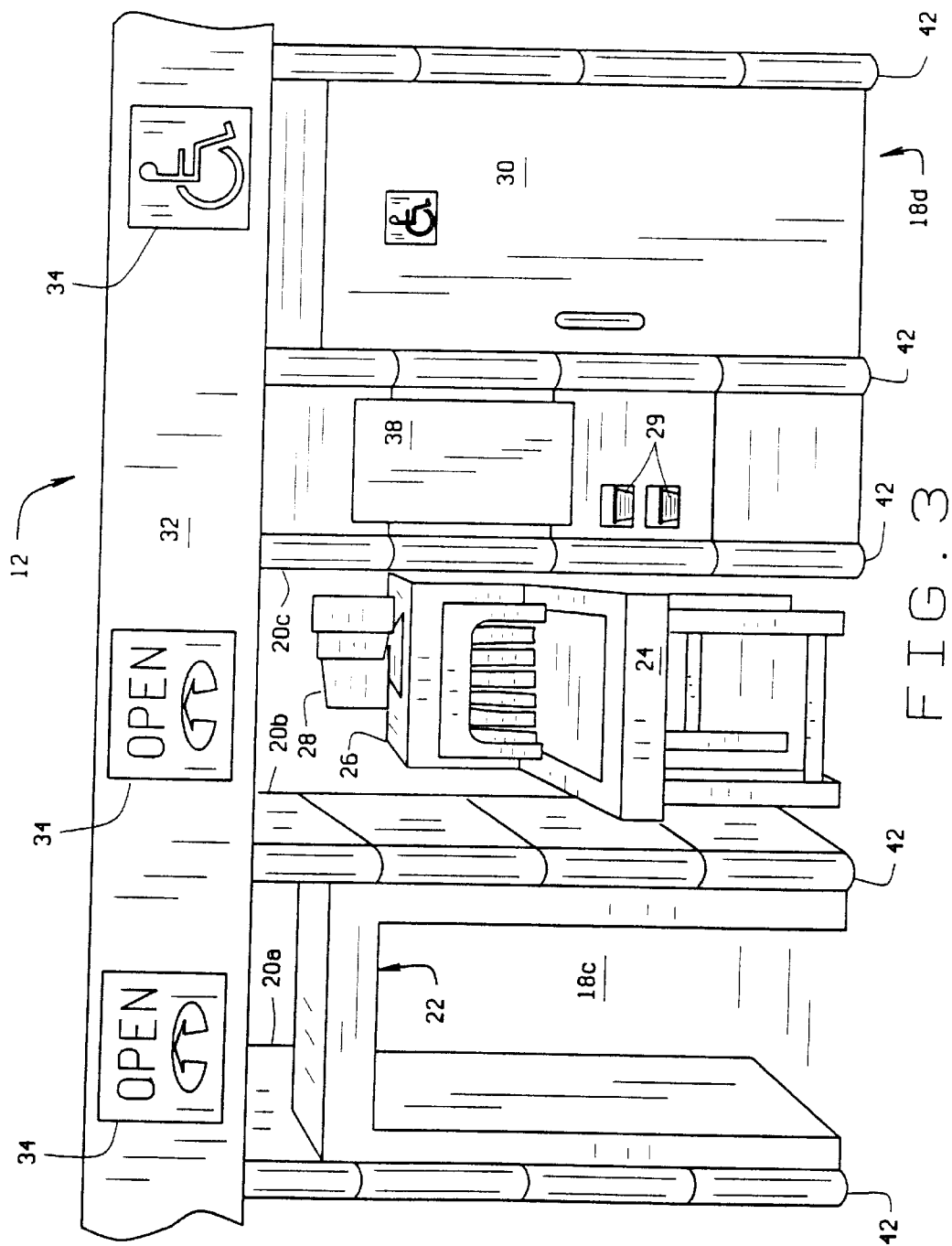
FIG. 3 is another perspective view of the system illustrating lanes by which regular and handicapped passengers are directed through the ingress (Q Arch) side of the checkpoint.
Figure 4:
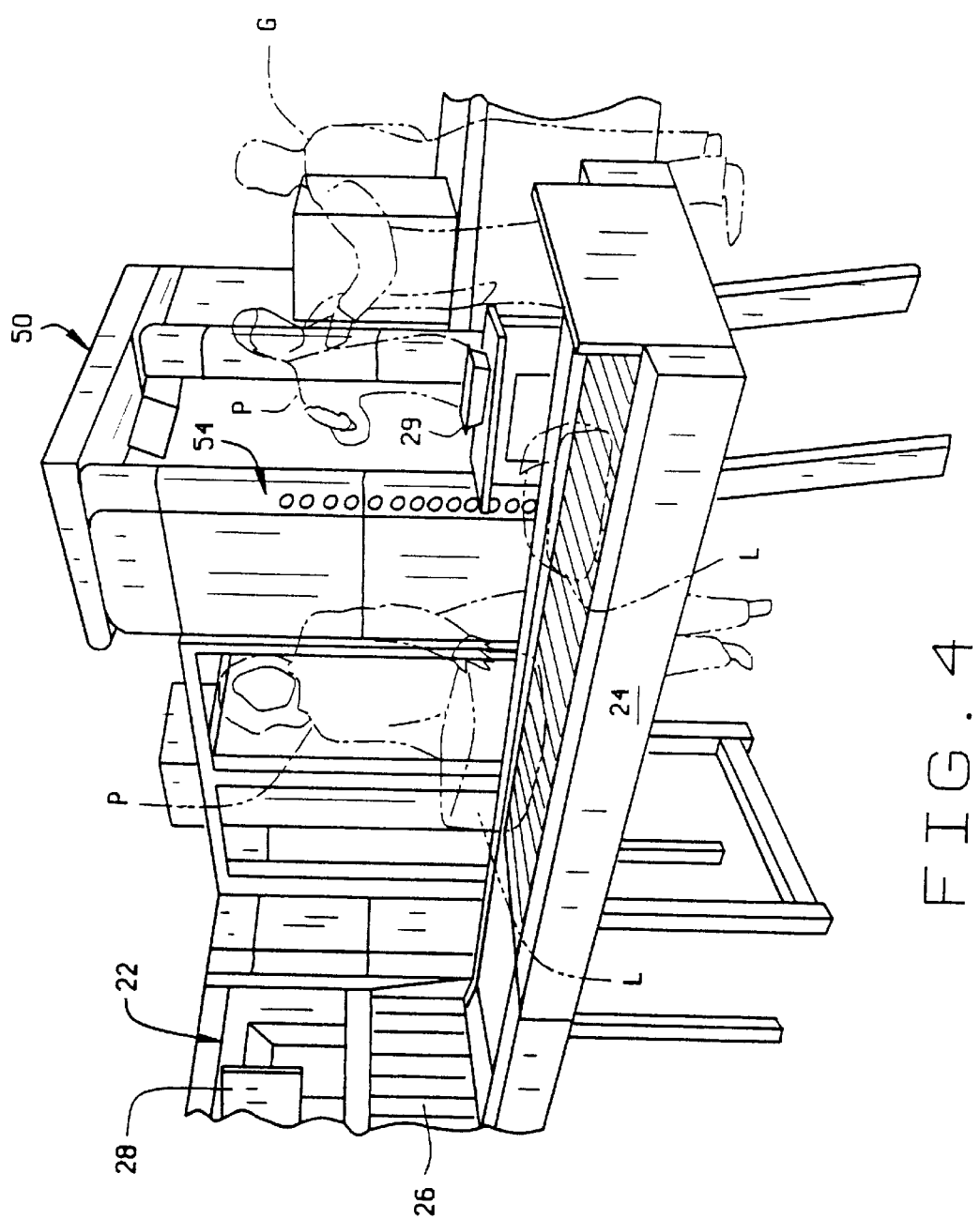
FIG. 4 is a perspective view of a conveyor and secondary screening portal of the ingress side of the system.
Figure 15:
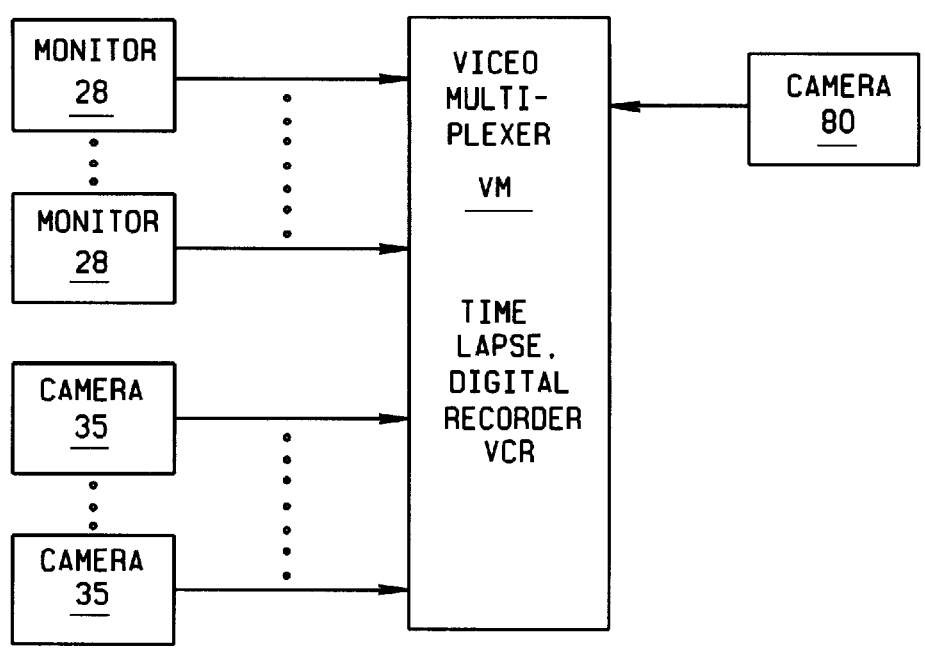
FIG. 15 is a block diagram illustrating how video images from various cameras and monitors are recorded; and, FIG. 16 is a perspective view of a control podium for use in place of a system monitoring station where space is limited.

A fascia or headboard 32 extends completely across Q section 12 above the portals. A series of CCTV monitors 34 are installed in the headboard at locations above each portal and each conveyor. Different information can be displayed on each monitor. For example, as shown in FIG. 3, an indication that a portal and its associated conveyor are open is indicated by displaying text, "This Lane OPEN" on the monitor. If the portal were closed, the words "This Lane Closed" are displayed. The portal for use by handicapped individuals or those needing assistance is readily identified by displaying the appropriate symbol on a static display handicapped sign. Besides these displays, the monitors can also be used to play tapes or discs on which instructions for proceeding through the portal can be shown. CCTV cameras 35 (see FIG. 5) are directed toward people approaching the portal with the monitors 34 displaying the images not only of the people but also of them placing their items on the conveyor. These images are also recorded at monitoring station 16. This has the advantage of letting people know their actions are being monitored so someone attempting theft or fraud (by claiming to have placed items on the conveyor when they did not) will not for fear of being caught. The views provided by each monitor 28 and camera 35 are recorded, using a video multiplexer VM and time lapse or digital recorder VCR (see FIG. 15). As previously noted, another CCTV camera monitors people retrieving items from the end of the conveyor. This further helps reduce fraud claims. An optional third camera (not shown) is installed to view and record passengers walking through a magnetometer unit 22.

The monitors 34 over each portal display DVD based animation to provide the pre-screening information to approaching persons. In one embodiment of the invention, this information is written on a DVD disc and played on a DVD player dedicated to the particular ingress lane L1–L3 with which the portal is associated. Each DVD player is, in turn, controlled via a serial communications interface with a controller (not shown) such as those manufactured by Creston Electronics, Inc. of Rockleigh, N.J.

In a second and preferred embodiment of the invention, a computer installed in station 16, for example, executes a proprietary program by which multiple presentations, each in a mpeg-2 format, can be simultaneously run on each monitor 34 using one of eight communication channels. The desired animation or information, as well as audio if desired, is loaded onto a hard drive of the computer, and when a particular presentation is to be made, that presentation is loaded into the computer memory and distributed over the appropriate channel or channels each of which has an audio capability.

This preferred embodiment has several operational advantages. There is no longer the need to record a separate DVD disc for each lane since information to be displayed for each lane can now be downloaded from a single, master file. The system has almost no moving parts which reduces the probability of breakdowns. The system is designed to automatically restart in the event of a power failure or system reset. The number of communication ports for the monitor display system is reduced to one, regardless of how many lanes are in operation at any one time. Finally, the computer system can also serve a secondary function of providing a gateway for remote access to the system.

A further embodiment of the invention includes a digital recording system which can replace video multiplexer VM and time lapse recorder VCR. This recording system is computer based and is capable of recording imagery from up to 24 cameras for a period of up to 30 days. Image files are compressed using MPEG-4 compression, for example. In addition to being transmissible to remote sites via appropriate communication links, the image files can also be formed*.AVI files and sent as e-mail messages.

In addition to the monitors 34, a further display 38 is also provided to people approaching the entrance. This display is installed between each portal as shown in FIG. 1. Display 38 is used with a specialized computer (not shown) designed to show static or dynamic graphics which display information about prohibited items such as bombs and guns which cannot be brought into the secure area, etc. Importantly, the display is sufficiently large that a great deal of information is readily displayed. The display also allows the information to be readily presented in many different languages so travelers of many nationalities are able to know what items are prohibited in the secure area.

A further aid to increasing passenger throughput employs vertically extending fiber optic lights 42 (see FIG. 3) installed on both sides of each portal and conveyor. The lights are installed from the base to the top of each portal so they can be readily seen at some distance from the portal. If the portal is open, the lights 42 for it and its associated conveyor are illuminated green. If not, the lights are illuminated red. These colors are generally recognized as "go" and "stop". Their use has the significant advantage of allowing those people who are well back from the entrance to readily ascertain which portal is open and which is not. People will tend to enter the line for those portals having the green lights and avoid any line for a portal whose lights are red. During tests of system 10, this feature has been found to greatly increase the number of people who pass through the entrance for a given period with each person being monitored as they do. The lights for portal 18d are, for example, blue to distinguish this handicap entrance from the other portals.

Figure 13A:
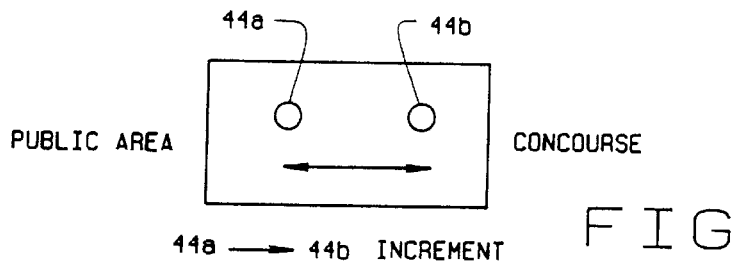
FIGS. 13A and 13B illustrate photo-optic sensors used in the ingress and egress sides of the system (FIG. 13A), and a simplified block diagram (FIG. 13B) illustrating how the detector outputs are used to obtain an accurate throughput count for the system.
Figure 13B:
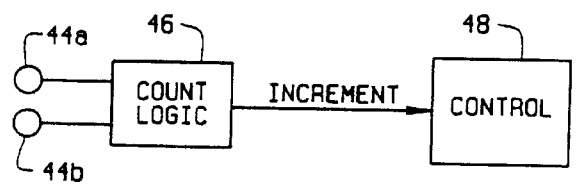

Referring to FIGS. 13A and 13B, Q section 12 of system 10 includes means for providing an accurate throughput count for people passing through the portals. Built into a sidewall 20a or 20b is a pair of optical sensors 44a, 44b. Passage of a person through the portal, in either direction, is sensed by both of these detectors. The output of the sensors is supplied to the count logic 46 of a counter 48 as shown in FIG. 13B. When a person enters the portal from the public area side, sensor 44a first detects the persons presence, then sensor 44b. The time sequence in which the sensor outputs are provided to count logic 46, results in an increment input being supplied to the counter to increase its count value by one.

Figure 5:
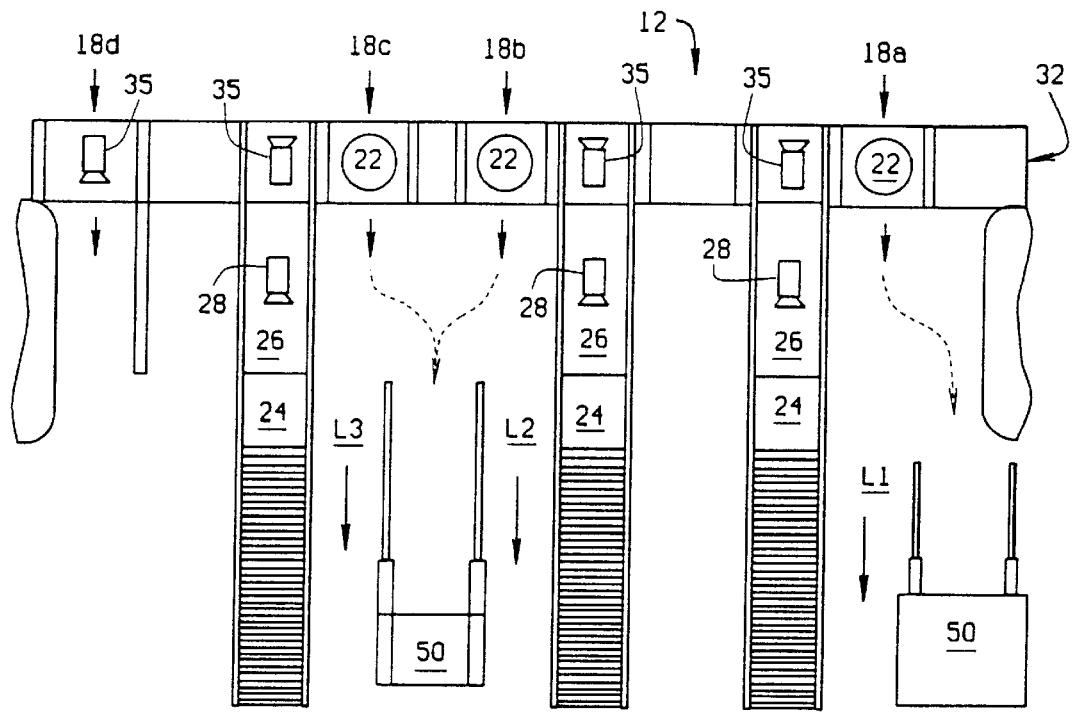
FIG. 5 is a top plan view, in schematic form, of the ingress portion of the system.

It is a significant feature of system 10 to facilitate quicker movement of people through the portals, even though a number of them will fail the magnetometer screen and have to be further scrutinized before being allowed to pass into the concourse. This is accomplished by using secondary portals indicated generally 50 in the drawings. These portals are located downstream of the portals 18a–18c so that persons first pass through one the portals 18a–18c where they are screened as previously described. The portals 50 are located between the exit side of the portals 18a–18c and the downstream end of their associated conveyors. The portals 50 are also to one side of the path by which one moves from the portal 18a–18c to the end of the conveyor to retrieve their luggage. As shown in FIG. 5, the respective conveyors 24 and the secondary portals 50 define lanes L1–L3 through which people pass from the public area into the secure area.

On the front of each portal 50 is a display 52 which includes, for example, direction arrows. If a person passes the primary screen of a magnetometer unit 22, display 52 provides an indication, a lighted green arrow, for example, directing the person to the end of the conveyor (the solid line arrow in FIG. 5) to retrieve their items. If the person fails the screen, a lighted green arrow directs them to secondary portal 50. Moving the person to the portal removes them from the normal flow path of people passing through the system so they can be further scrutinized while not unduly delaying anyone else.

Each portal 50 has a magnetometer housed in it just as the magnetometers in the units 22. These magnetometers are less sensitive than those in these other units. Before entering portal 50, the person again removes personal items and places them in a tray 29. If the person successfully passes through portal 50, they are free to retrieve their belongings from conveyor 24 and proceed on their way. At the outlet end of the portal is a display 54 comprising a vertical arrangement of lights extending up each side of the portal. The magnetometer housed in the portal controls illumination of these lights such that if the person fails the screen, the magnetometer output causes lights to be illuminated in the approximate location on the person's body where the magnetometer sensed whatever it is that caused the person to fail the screen. A security guard G using a wand magnetometer now uses this indication to search the person for the cause of the alarm. If the guard locates whatever it is, and if it determined that the source is not a threat, then the person is allowed to retrieve their belongings and continue. Otherwise, they are detained and removed from the area.

With respect to the items which are sent through the conveyor, if a guard viewing the monitor 28 spots anything suspect, the item is removed to an area away from the flow of people entering the concourse where the item is opened for inspection. Again this eliminates possible bottlenecks and increases throughput through the Q section.

Figure 6:
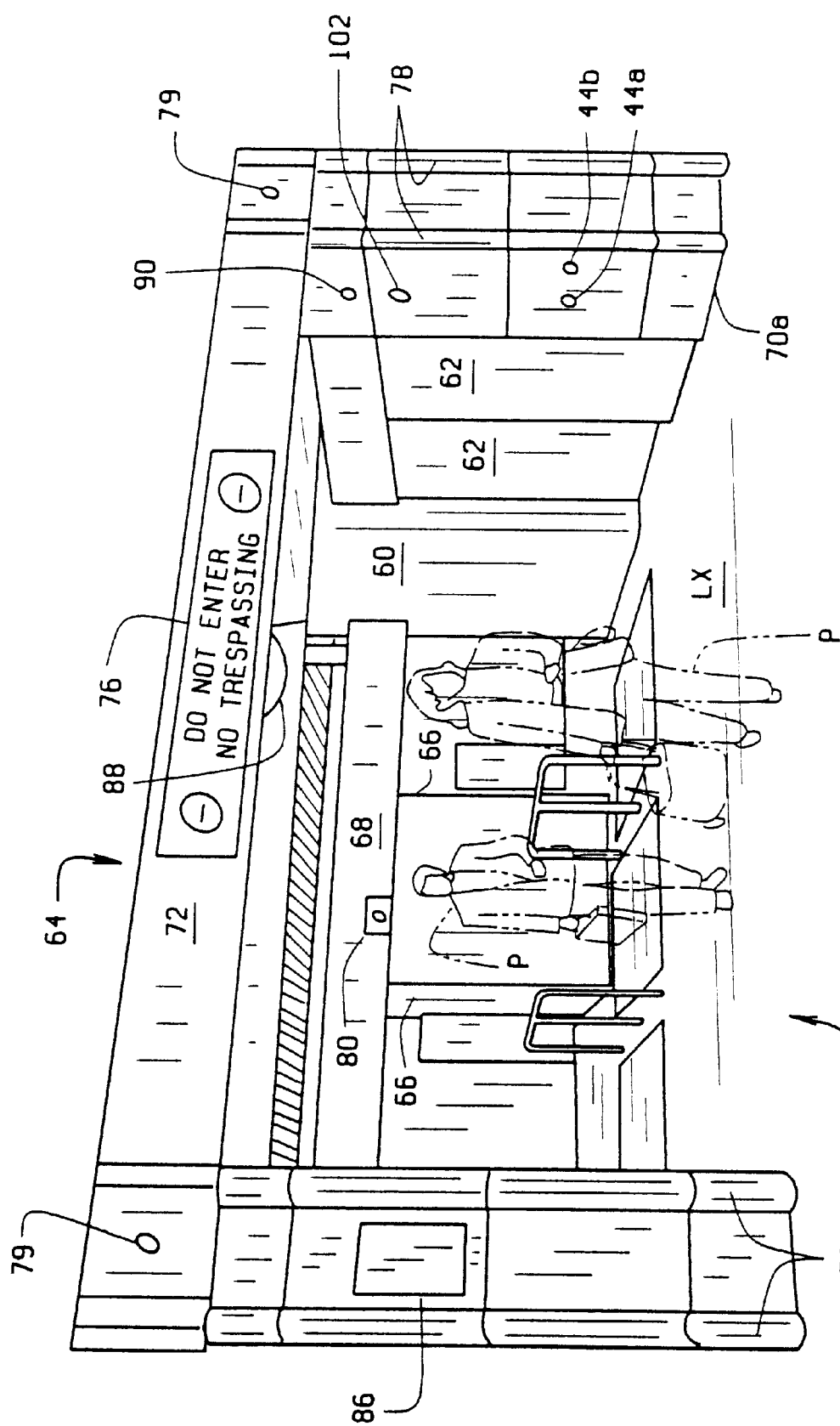
FIG. 6 is a perspective view of the egress (X Arch) side of the system viewed from the public area side of the checkpoint.

Referring to FIGS. 1 and 6, Q section 10 extends from one sidewall W1 of the concourse across a portion of the concourse. The outer end of the Q section is defined by a sidewall W2 formed of spaced columns indicated generally 60. Panels indicated 62 extend between the columns. These panels are of a uniform height. Some of the panels 62 are longer than others. Further, the panels are made of a transparent material so guards can readily view people exiting the concourse as well as people who may be trying to enter the concourse from that side. The other sidewall W3 of the concourse defines the other side of an exit lane Lx controlled by X section 14. As shown in FIG. 1, columns 60 and panels 62 are formed to funnel exiting passengers down the exit lane which is wider at its entrance and narrows as people approach the exit.

The egress (X) portion of the system includes an arch incorporating electronic imaging, computing, and detection equipment housed in a facade. The installation is designed to have a minimum system footprint. The X section of system first includes an outer portal or electronic archway 64 (see FIG. 6) through which passengers enter the public area of the terminal. Prior to passing through portal 64, passengers pass through one of a series of doors 66 which extend across Lane Lx. These doors open automatically as passengers approach them, and the doors open only outwardly. A headboard 68 extends across the top of the doors and includes signage indicating that this is the exit path from the concourse.

Figure 7:
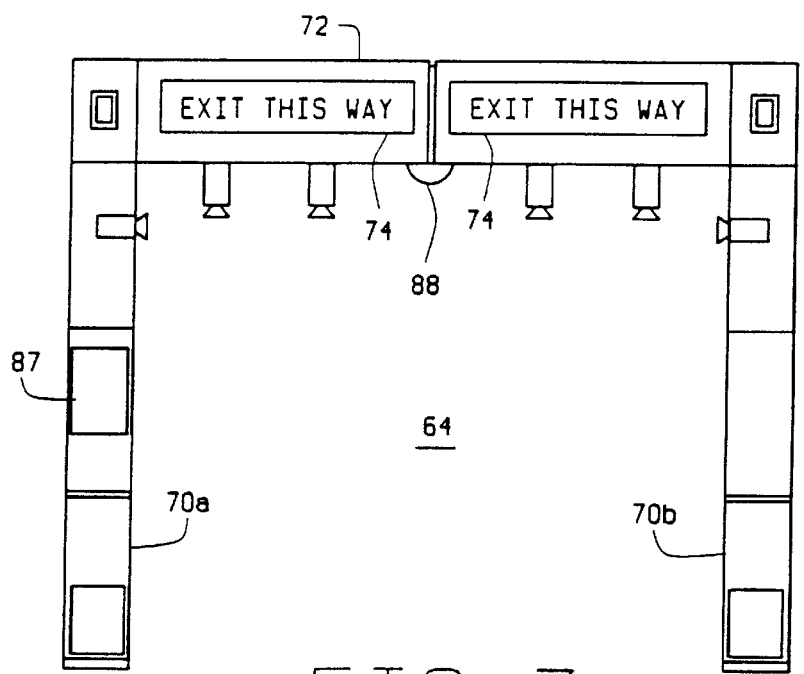
FIG. 7 is an elevational view, in schematic form, of an egress lane.

As shown in FIG. 1, portal 64 is in line-of-sight with station 16. The entry side of portal 64 is shown in FIG. 7, and the exit side of the portal in FIG. 6. The portal is defined by respective sidewalls 70a, 70b, and a headboard or bulkhead 72. Headboard 72 includes signage 74 (see FIG. 6) on the entry side of the portal indicating that this is the exit. Signage 76 (see FIG. 7) on the other or outer side of the headboard indicates that this is not an entry into the concourse and that persons should not try to enter this way. Further, vertical strips of lights 78 are installed on the outside of the portal. These lights glow red at all times to indicate that no entry is allowed through this portal. In alarm situations, blue strobe lights 79 located at each end of headboard 72 flash on and off during a pre-alarm or alarm condition. As noted, the exit portal houses all the components of the X section control system. The portal functions to provide an exclusion or "sterile" area about the exit; that is, an area in front of the portal which is kept free of people wanting to approach the portal from the public area.

It is an important feature of the invention that passenger movement through lane Lx is monitored at all times, and is done so without a guard being present to monitor the exit lane. Further, X section 14 includes means for monitoring people approaching portal 64 from outside the portal, and for warning them away from the exit lane. No attempt is made to distinguish between those who inadvertently wander into the sterile area or those who move into it intentionally. All persons entering the sterile area are considered intruders. In operation, X section 14 has both a pre-alarm and an alarm condition. A pre-alarm condition occurs when a person enters the exclusion area immediately in front of portal 64. When this occurs:

an audio message is played announcing the violation and directing the person to step away from the portal, and
the strobe lights 79 on the public area side of the portal begin flashing.

The pre-alarm condition automatically resets after a predetermined interval.

If an intruder physically violates the threshold of the exit portal, an alarm condition results. In this situation, the video system begins displaying alarm video at the control station,
the audio system begins playing an audio message announcing the violation and including instructions to the intruder,
the strobe lights 79 on the public side of the arch begin flashing,
the conveyors 24 of the Q section stop running, and an annunciator sounds at the control station alerting security personnel.

The alarm condition continues until deactivated by security personnel, or there is a preprogrammed automatic reset.

X section 14 incorporates three separate detection technologies and three separate processing systems. The detection technologies include multi-channel video motion detection, photo-optics, and directional microwave (doppler radar). The processing systems include a computer based video frame grabber, a multi-point programmable logic controller, and a touch screen command and control system. As shown in FIG. 6, a CCTV camera 80 installed on the outer face of headboard 68 is directed outwardly to view people approaching portal 64 from the public area. A television monitor 82 on console 84 of monitoring station 16 displays the view seen through camera 80. A guard at the station views the video to monitor the activity in front of the portal. The image from camera 82 is also recorded. Recordation can be at the monitoring station, or the video signal can be transmitted to a remote (off site) location for viewing and recordation at the remote site.

In addition to the television camera, another pair of the photo-optic sensors 44a', 44b ' are installed portal 64. As before, the direction of passage through the portal is determined by which photo-optic sensor is blocked first and which second by a person. For the people passing through portal 64 as shown in FIG. 6, the correct sequence is first detector 44a', then detector 44b'. If this sequence is reversed, then as shown in FIGS. 16A, 16B, a passage logic PL is responsive to trigger an alarm condition.

Figures 10, 11:
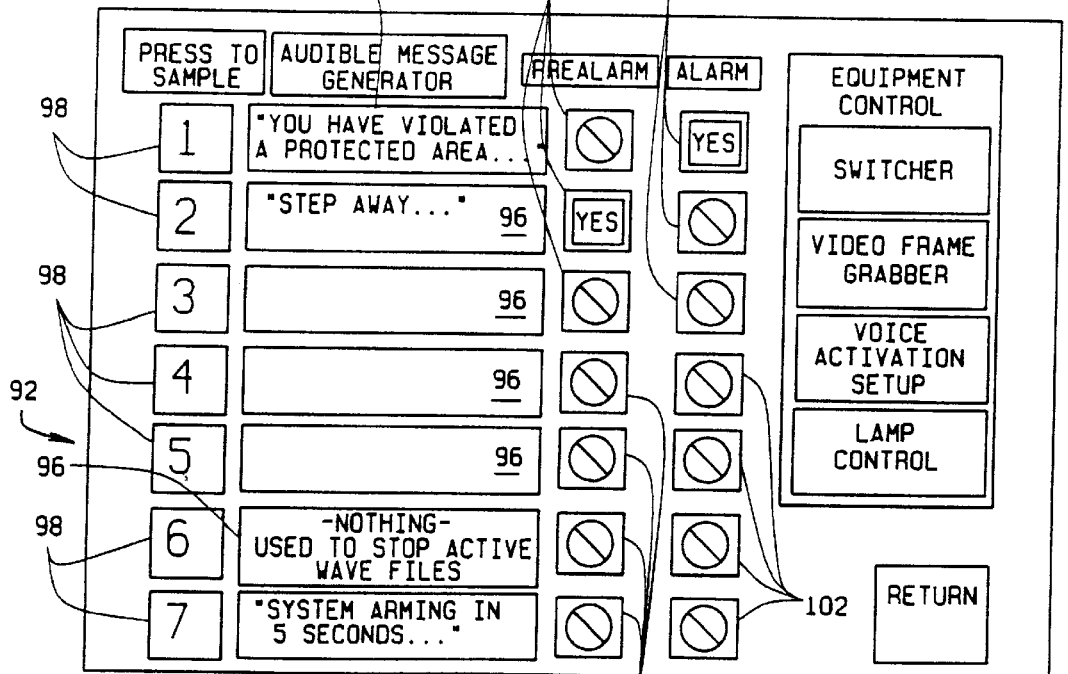
FIG. 10 is another illustration of a control panel display showing an alarm stimulus configuration for the X Arch portion of the system.
FIG. 11 is another illustration of a control panel display showing an audible alarm menu for the X Arch portion of the system.
Figure 12:
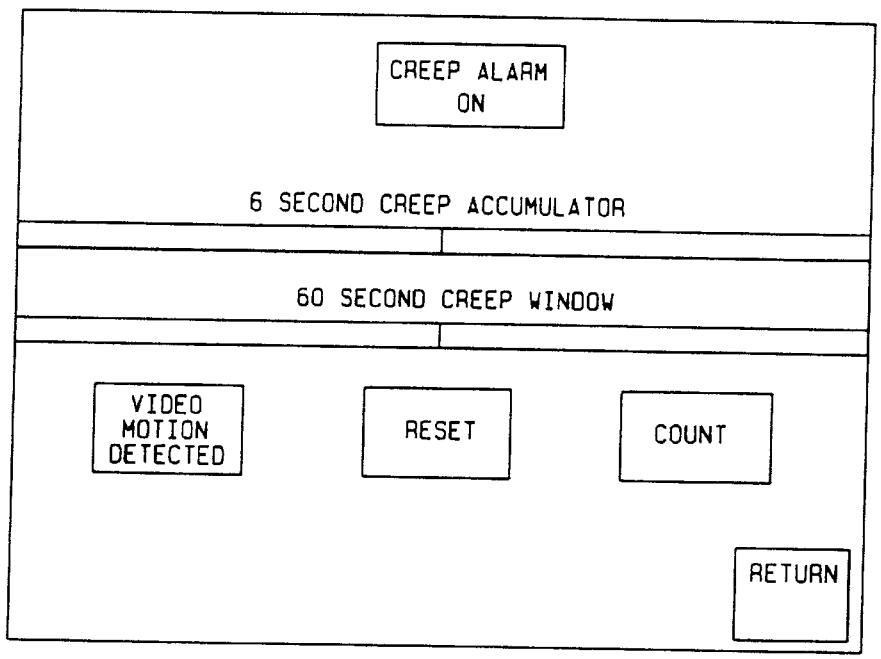
FIG. 12 is another illustration of a control panel display showing a creep detection set-up for the X portion of the system.

A directional microwave (doppler) 88 detects movement of people from the public area toward the portal. The radar is located in the headboard of portal 64. It is a feature of the invention that very slow movements of an intruder attempting to move into the secure area through portal 64 are readily detected and an alarm sounded. This "creep" movement detection is important because it has been found that people or objects moving very slowly through a space tend to become part of the background; so much so, that in many detection schemes, their presence is overlooked. As shown in FIGS. 10 and 12, a creep detection capability is one of the monitoring features incorporated in station 16. The creep detection function employed using multiple channels of video motion detection 88 can be selectively set to monitor movements over a sixty (60) second interval. It may be, for example, that someone exiting the concourse may stop in the sterile area for any of a number of mundane reasons (adjust their luggage, wait for someone exiting behind them, etc.). However, people who do pause typically do so only for a short period of time. With the sixty second creep detection capability anyone who lingers for a substantial period will cause an alarm.

Referring to FIG. 11, an audio alarm system 92 incorporated in the control panel of station 16 includes a vertical array 94 of panels 96 each of which displays a particular broadcast warning. To the left of array 94 is a column of pushbuttons 98 which a station 16 operator pushes to sample audio messages which are broadcast. The operator can select any of the messages as either a pre-alarm or an alarm message. To select one of the messages as a pre-alarm message, the operator pushes an appropriate pushbutton 100 in the column of pushbuttons immediately to the right of array 94. The operator selects a message to be broadcast as part of an alarm by pushing one of the pushbuttons 102 in the column of pushbuttons to the right of the pushbutton 100. While not shown, the messages are available in languages other than English. When the message is broadcast, it is broadcast in each of the selected languages. An annunciator or speaker 102 is installed in portal 64. The speaker broadcasts the selected warning or alarm messages. The level of a broadcast message is sufficiently loud as to be easily heard over the normal level of noise in the sterile area.

Figure 8:
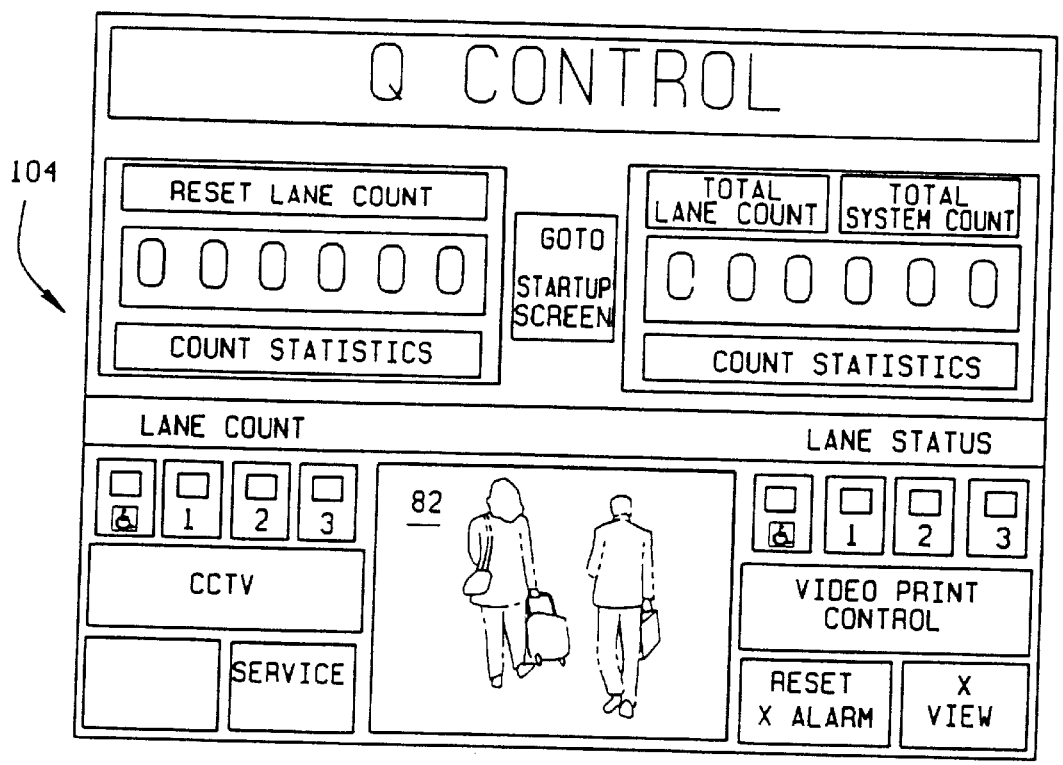
FIG. 8 illustrates one portion of a control panel display for the Q control panel portion of the system.
Figure 9:
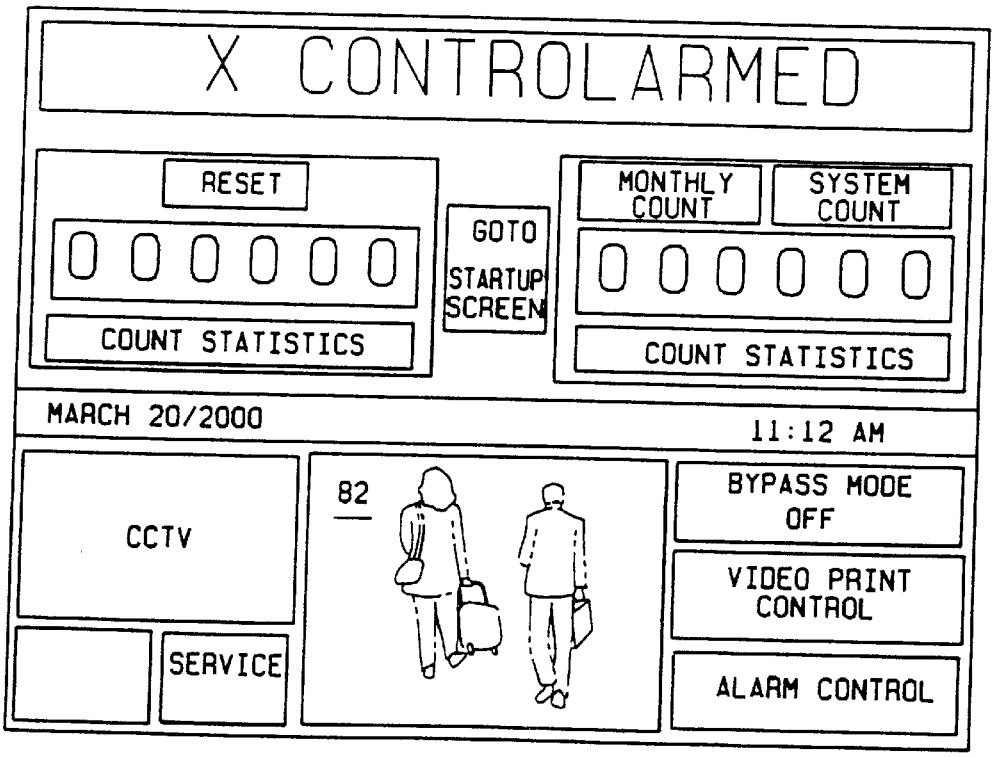
FIG. 9 is an illustration similar to FIG. 8 for the X control panel portion of the system.

Referring to FIGS. 8 and 9, another feature of system 10 is the ability to provide accurate counts of people entering and leaving the concourse. As shown in FIG. 8, a panel 104 at station 16 provides count information for the Q control portion of the system. As previously noted, both total count and individual lane count information is provided. As shown in FIG. 9, count information for people egressing from the concourse through portal 64 is also provided. The photo-optic sensors 44a'–44b' previously described provide this information in the same manner as the sensors 44a, 44b with regard to the ingress lanes.

Figure 16:
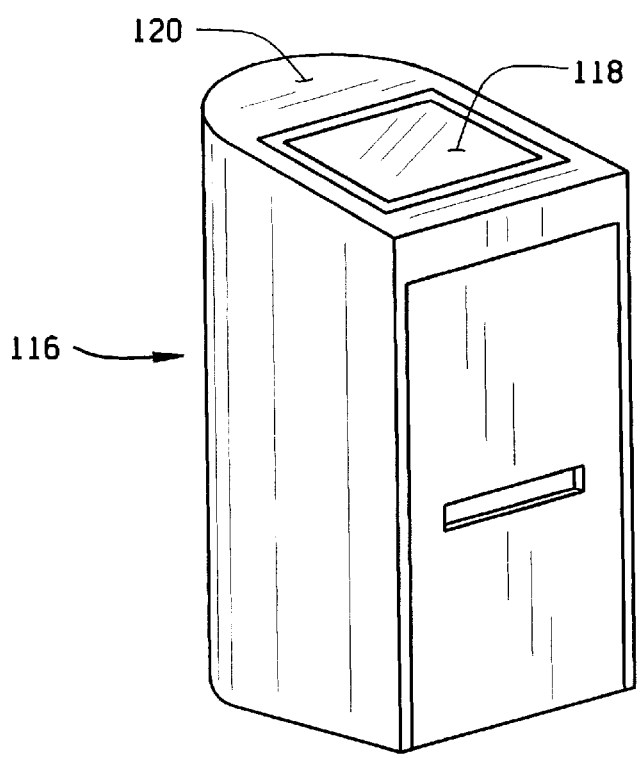

Finally, referring to FIG. 16, in some installations it may not be possible to accommodate a system monitoring station 16 such as shown in FIG. 1. In these instances, a control podium 116 is used in place of station 16. Podium 116 takes up less than 4 square feet of floor space but has housed within it all of the equipment and software required to operate system 10. A video monitor 118 is installed in the top surface 120 of the podium. A video recorder (not shown) is installed inside the podium. Monitor 118 is, for example, a 17" ruggedized and sealed computer monitor which provides a high quality image. The monitor is equipped with a sonic wave touch screen overlay which interfaces with a touch panel interface device. Monitor 118 is available, for example, from Elo TouchSystems, and the touch panel interface from the previously mentioned Creston Electronics, Inc.

Operation of podium 116 basically mimics that of previously described station 16, as well as replacing various video monitors. An operator of the system now has all the various controls and video information located directly in front of him or her on the monitor and touch screen. In addition, when the digital recording system previously described is incorporated into the podium, live or recorded video will be able to be displayed on monitor 118.

What has been described is an ingress/egress control system by which passenger flow into and of a secure area is tightly controlled. The system maintains a high level of security without unduly interrupting passenger movement. Use of the secondary portals, light system, and video information provided to ingressing passengers has been found to increase passenger flow up to 30% compared to conventional passenger screening systems. While certain screening aspects of the system are unobtrusive, others such as providing images of the people as they move through the ingress portion of the system have been found to greatly reduce incidents of theft and fraudulent claims of loss.

The egress portion of the system provides a controlled exit from the secure area and uses a plurality of detection methodologies to identify potential intruders. A sterile area is established in front of the exit and anyone intruding or throwing objects into this sterile area are immediately detected and warned away. Video of any intruder is recorded and stored either on site, remotely, or both. The egress portion of the system eliminates the need for a guard to be positioned in the exit lane to look for intruders. At the same time, the system is designed such that an intruder alarm instantly alerts guards in the area as to an intruder so they can deal with him if he does not immediately leave the area.

A control station of the system is located adjacent the ingress and egress points. The station includes a series of control features by which lanes are opened and closed, by which video monitoring is controlled for both the ingress and egress portions of the system, and by which concourse usage information is acquired and maintained. The control station also serves as place for access alarms that are detected by the exit control device. Features such as audible annunication, video control, and video printing aid in the success of stoping or reducing the threat of security breach into secure area.

The system is made of quality materials so to present a pleasing appearance to passengers and to provide the unobtrusiveness previously mentioned. At the same time, the system is effective to provide a high level of security with minimum guard personnel.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. An ingress/egress (Q/X) control system for controlling the flow of persons from an unsecured area into a secured area, and from the secured area into the unsecured area comprising:

an entrance portal through which persons entering the secured area must pass;

first screening means at the entrance portal screening each person passing through the entrance portal for the presence of items prohibited from the secured area and identifying any person suspected of conveying any such item through the entrance portal;

a secondary entrance portal downstream of the first said entrance portal and to which persons identified as possibly conveying prohibited items are directed, persons passing tie first screening means continuing into the secured area without further delay;

a second screening means for further screening persons directed to the secondary entrance portal;

an exit passage having an entrance in the secure area and an exit in the unsecured area add including an exit portal facilitating movement of persons through the exit passage; and, exit screening means monitoring an area adjacent the exit and providing an alarm whenever anyone attempts to enter the secure area through the exit passage from the unsecured area.

2. The control system of claim 1 wherein the exit screening means includes a plurality of detectors detecting attempted movement into the exit passage from the unsecured area.

3. The control system of claim 2 wherein the exit screening means includes imaging means directed at the area adjacent the exit to obtain an image of anyone approaching the exit passage from the unsecured area.

4. The control system of claim 3 wherein the exit screening means further includes an optical sensor detecting movement of persons from the unsecured area into the exit passage.

5. The control system of claim 4 wherein the screening means further includes microwave means detecting movement of persons from the unsecured area toward the exit passage.

6. The control system of claim 5 wherein the microwave means includes a doppler radar capable detecting relatively slow movements by persons attempting to enter the exit passage from the unsecured area to prevent someone from creeping into the exit passage.

7. The control system of claim 1 further including an audio alarm activated by the exit screening means when an intrusion is detected.

8. The control system of claim 7 further including a visual alarm activated by the exit screening means when an intrusion is detected.

9. The control system of claim 1 further including a plurality of entrance portals each of which has an associated secondary entrance portal.

10. The control system of claim 9 further including lighting means at the entrance of each entrance portal indicating whether the entrance portal is open or closed.

11. The control system of claim 10 further including video display means adjacent each entrance portal for displaying video images indicating how a person should proceed through the entrance portal.

12. The control system of claim 9 further including a conveyor located adjacent each entrance portal for persons passing through an entrance portal to place objects they are carrying on the conveyor.

13. The control system of claim 12 further including means associated with each conveyor for scanning objects moving over the conveyor to determine if the objects are allowable into the secured area and for providing an alarm if an object is not allowable.

14. The control system of claim 13 further including video monitoring means monitoring each entrance portal and each conveyor associated therewith so to provide video images of each person entering an entrance portal and the placement of objects on the conveyor adjacent each entrance portal.

15. The control means of claim 14 further including video recording means recording the video images of the persons entering an entrance portal and the conveyors on which their objects are placed.

16. The control system of claim 9 wherein at least one of the first said portals is accessible by handicapped persons.

17. The control system of claim 1 further including a control station manned by security personnel for monitoring the flow of people through the system in either direction to facilitate the flow of people, to monitor persons who fail the screening as they attempt to enter into the secure area the entrance portal, and to monitor for intruders attempting to enter the secure area through the exit passage.

18. The control system of claim 17 wherein the entrance portal and exit passages each include imaging means for obtaining visual images of persons and the station includes a monitor for viewing the images and means for selecting which image to view.

19. The control system of claim 17 wherein the entrance portal includes a video display for displaying video images illustrating how to progress through the portal and the control station includes video control means controlling operation of the video display.

20. The control system of claim 17 wherein the exit passage includes an audio system for broadcasting an audio alarm when an intruder is detected and the control station includes audio control means controlling operation of the audio system.

21. The control system of claim 20 wherein the audio system includes prerecorded messages which can be broadcast at an intruder and the audio control means allows selection of individual messages to be broadcast.

22. The control system of claim 17 which includes password protection so only persons with the proper password can operate the control station.

23. An ingress (Q) control system for controlling the flow of people from an unsecured area into a secured area comprising:
  at least one portal through which persons entering the secured area must pass;
  screening means located at the portal for screening each person passing through the portal for the presence of items prohibited from the secured area and identifying any person suspected of conveying any such item through the portal;
  a secondary portal located downstream of the first said portal; and,
  means responsive to an indication from the screening means for routing a suspected person from the first portal to the secondary portal for further screening, said means allowing all other persons passing through the first said portal to continue into the secured area without further delay.

24. The control system of claim 23 in which a person directed to the secondary portal must pass therethrough and further including a second screening means located at the secondary portal for screening each person passing through the portal for the presence of items prohibited from the secured area.

25. The control system of claim 24 further including a first display means for directing a suspect person from the first said portal to the secondary portal.

26. The control system of claim 25 further including a second display means located at an exit from the secondary portal for indicating where on a person passing through the secondary portal an item causing the person to fail a screening is located.

27. The control system of claim 26 wherein the screening means in the secondary portal is more sensitive than the screening means in the first said portal.

28. The control system of claim 23 further including a plurality of first said portals each of which has an associated secondary portal.

29. The control system of claim 28 wherein at least one of the first said portals is accessible by handicapped persons.

30. The control system of claim 28 further including lighting means at the entrance of each portal indicating whether the portal is open for persons to enter the portal or closed so persons should use another portal.

31. The control system of claim 30 further including video display means adjacent each portal for displaying video images indicating how the person should proceed through the portal.

32. The control system of claim 28 further including a conveyor located adjacent each portal for persons to place objects on the conveyor.

33. The control system of claim 32 further including means associated with each conveyor for scanning objects moving over the conveyor to determine if the objects are allowable in the secured area and for providing an alarm if an object is not allowable.

34. The control system of claim 33 further including video monitoring means monitoring each of the first said portals and each conveyor associated therewith so to provide video images of each person entering one of the first said portals and the placement of objects on the conveyor adjacent the first said portal.

35. The control means of claim 34 further including video recording means recording the video images of the persons entering the first said portals and the conveyors on which their objects are placed.

36. The control means of claim 35 further including means transmitting the video images to a remote location for viewing and storage.

37. The control means of claim 36 further including a video playback by which recorded video images are viewable at the ingress site if there is a question concerning a person entering one of the first said portals or an object placed on a conveyor.

38. The control system of claim 37 further including at lease one counter counting the number of persons entering each of the first said portals.

39. The control system of claim 37 further including a counter counting the number of persons entering each of the first said portals.

40. An egress (X) control system for controlling the flow of persons from a secure area into a non-secure area while monitoring the movement of any possible intruder, whether intentional or non-intentional, in the opposite direction from the non-secure area into the secure area comprising:
  means defining a passage having an entrance which is in the secure area and an exit which is in the non-secure area:
  a portal facilitating movement of persons through the passage from the entrance to the exit; and,
  screening means monitoring an area adjacent the exit and providing an alarm triggered by attempts to enter the passage from its exit, the screening means including a plurality of detectors detecting attempted movement into the passage from its exit.

41. The control system of claim 40 in which the portal includes a one-way door which opens only to allow persons to move from the secured area through the passage into the non-secured area.

42. The control system of claim 40 wherein the screening means includes imaging means directed at the area adjacent the exit and obtaining an image of an approach to the passage from the non-secured area.

43. The control system of claim 42 further including recording means recording the images acquired by the imaging means.

44. The control system of claim 43 further including means storing the recorded images, the images being storable at a site remote from the location of the passage.

45. The control system of claim 42 wherein the screening means includes an optical sensor detecting movement of persons from the exit of the passage into the passage.

46. The control system of claim 45 wherein the screening means further includes microwave means detecting movement of persons from the unsecured area toward the exit of the passage.

47. The control system of claim 46 wherein the microwave means includes a doppler radar.

48. The control system of claim 47 wherein the doppler radar detects relatively slow movements by persons attempting to enter the passage from its exit end thereby preventing someone from creeping into the passage from its exit end.

49. The control system of claim 40 further including an audio alarm activated by the screening means when an intrusion is detected.

50. The control system of claim 49 further including a visual alarm activated by the screening means when an intrusion is detected.

51. The control system of claim 50 wherein the visual alarm includes a plurality of lights on the portal through which persons exit from the passage, the lights flashing on and off when activated.

52. The control system of claim 40 further including means counting the number of persons exiting the secured area through the passage.

53. An ingress/egress (Q/X) control system for controlling the flow of persons from a non-secure area into a secure area through an entrance passage and screening the persons moving through the entrance passage; for moving persons from the secure area into the non-secure area through a separate exit passage and monitoring an outlet potion of the exit passage to detect possible intruders, whether intentional or unintentional, attempting to enter the secure area through the exit passage; and, a control station manned by security personnel for monitoring the flow of people through the system in either direction so to facilitate the flow of people into and out of the secure area, including persons who fail the screening as they attempt to enter into the secure area and are directed from the entrance passage for further screening before they are allowed into the secure area, and possible intruders attempting to enter the secure area through the exit passage.

54. The control station of claim 53 wherein the entrance and exit passages each include imaging means for obtaining visual images of persons moving through or toward the respective passages and the station includes a monitor for viewing the images and means for selecting which image to view.

55. The control station of claim 54 further including image storage means for storing video images.

56. The control station of claim 55 further including means transmitting the video images to a remote location for viewing and storage at the remote location.

57. The control station of claim 53 wherein the entrance passage includes a video display for displaying video images illustrating how to progress through the entrance passage and the control station includes video control means controlling operation of the video display.

58. The control station of claim 53 wherein the exit passage includes an audio system for broadcasting an audio alarm when an intruder is detected and the control station includes audio control means controlling operation of the audio system.

59. The control station of claim 58 wherein the audio system includes a plurality of pre-recorded messages which can be broadcast at an intruder and the audio control means allows selection of individual messages to be broadcast.

60. The control station of claim 53 further including means for separately counting the number of persons passing through the entrance and exit passages.

61. The control station of claim 53 wherein the entrance passage includes a plurality of lanes and the number of persons passing through each lane is separately counted.

62. The control station of claim 53 which includes password protection so only persons with the proper password can operate the station.

* * * * *

UNITED STATES PATENT AND TRADEMARK OFFICE
CERTIFICATE OF CORRECTION

PATENT NO.    : 6,507,278 B1
DATED         : January 14, 2003
INVENTOR(S)   : Sam Brunetti et al.

Page 1 of 1

It is certified that error appears in the above-identified patent and that said Letters Patent is hereby corrected as shown below:

<u>Column 13,</u>
Line 37, replace "tie" with -- the --
Line 43, replace "add" with -- and --.

Signed and Sealed this

Twenty-second Day of July, 2003

JAMES E. ROGAN
*Director of the United States Patent and Trademark Office*